United States Patent
Hashimoto et al.

(10) Patent No.: US 9,810,525 B2
(45) Date of Patent: Nov. 7, 2017

(54) BOLT SENSOR

(71) Applicant: MINEBEA CO., LTD., Kitasaku-gun, Nagano (JP)

(72) Inventors: Takayori Hashimoto, Fujisawa (JP); Takuya Kitajima, Fukuroi (JP)

(73) Assignee: MINEBEA CO., LTD., Kitasaku-gun (JP)

(*) Notice: Subject to any disclaimer, the term of this patent is extended or adjusted under 35 U.S.C. 154(b) by 0 days.

(21) Appl. No.: 15/184,285

(22) Filed: Jun. 16, 2016

(65) Prior Publication Data

US 2017/0003118 A1   Jan. 5, 2017

(30) Foreign Application Priority Data

Jun. 30, 2015 (JP) .................. 2015-131332

(51) Int. Cl.
 *G01B 11/16* (2006.01)
 *G01L 5/24* (2006.01)
 *G01M 5/00* (2006.01)

(52) U.S. Cl.
 CPC .............. *G01B 11/16* (2013.01); *G01L 5/243* (2013.01); *G01M 5/0041* (2013.01); *G01M 5/0091* (2013.01)

(58) Field of Classification Search
 CPC ............................ G01B 11/16; G01B 11/2416
 USPC ........................................................ 356/32
 See application file for complete search history.

(56) References Cited

U.S. PATENT DOCUMENTS

| | | | | |
|---|---|---|---|---|
| 5,633,494 A | * | 5/1997 | Danisch | G02B 6/02057 |
| | | | | 250/227.14 |
| 2014/0306574 A1 | * | 10/2014 | Twerdochlib | H02K 1/16 |
| | | | | 310/216.129 |
| 2014/0335469 A1 | * | 11/2014 | Boyden | A61B 5/4803 |
| | | | | 433/27 |

FOREIGN PATENT DOCUMENTS

| | | |
|---|---|---|
| JP | H11-118637 A | 4/1999 |
| JP | 2002-004798 A | 1/2002 |

* cited by examiner

*Primary Examiner* — Sunghee Y Gray
(74) *Attorney, Agent, or Firm* — Oliff PLC

(57) ABSTRACT

There is provided a bolt sensor which detects a fastened state of a bolt. The bolt sensor includes a sensor body including a through hole into which a shaft of the bolt is to be inserted, a light guide extending along an outer periphery of the sensor body, and a light source configured to emit light to the light guide based on output of the sensor body.

8 Claims, 5 Drawing Sheets

BOLT SENSOR

CROSS REFERENCE TO RELATED APPLICATION

The present application claims priority from Japanese Patent Application No. 2015-131332 under the title of "BOLT SENSOR", filed on Jun. 30, 2015, the disclosure of which is incorporated herein by reference in its entirety.

BACKGROUND

The present disclosure relates to a bolt sensor, in particular, to a bolt sensor configured to optically indicate a fastened state of a bolt.

Civil engineering structures, such as bridges and tunnels, include many bolt-joint parts. The bolt-joint parts regularly undergo inspection for checking the presence of loose bolts. The inspection is typically performed by an inspector checking bolt-joint parts visually and/or by hammering.

Japanese Patent Application Laid-open No. 2002-4798 discloses a detection system in which a transponder including a strain sensor and a circuit for display and transmission are provided in a spacer to be installed between a nut and a body to which the bolt is applied. In this detection system, when the strain is generated in the system in the axial direction of the bolt, an LED of the circuit for display and transmission is lit. Japanese Patent Application Laid-open No. H11-118637 discloses a sensor bolt in which a sensor is embedded in a bolt and a display such as an LED is disposed in the head of the bolt. When the sensor bolt comes loose, the LED of this sensor bolt is lit.

SUMMARY

It is preferred that the bolt-joint parts be inspected or checked easily and reliably. In each of the detection system and the sensor bolt described above, however, the display such as the LED may become invisible depending on the position of bolt joint. This would prevent the bolt, which may be loose, from being detected appropriately.

An object of the present disclosure is to provide a bolt sensor which solves the above problem, that is, which can detect a fastened state of a bolt easily and reliably without being affected by usage conditions (ambient environments) of the bolt.

According to an aspect related to the present disclosure, there is provided a bolt sensor configured to detect a fastened state of a bolt, including:
 a sensor body including a through hole into which a shaft of the bolt is to be inserted;
 a light guide extending along an outer periphery of the sensor body; and
 a light source configured to emit light to the light guide based on output of the sensor body.

EMBODIMENTS

Embodiment

An explanation will be made about an embodiment of the present disclosure with reference to FIGS. 1 to 5.

Figure 1:
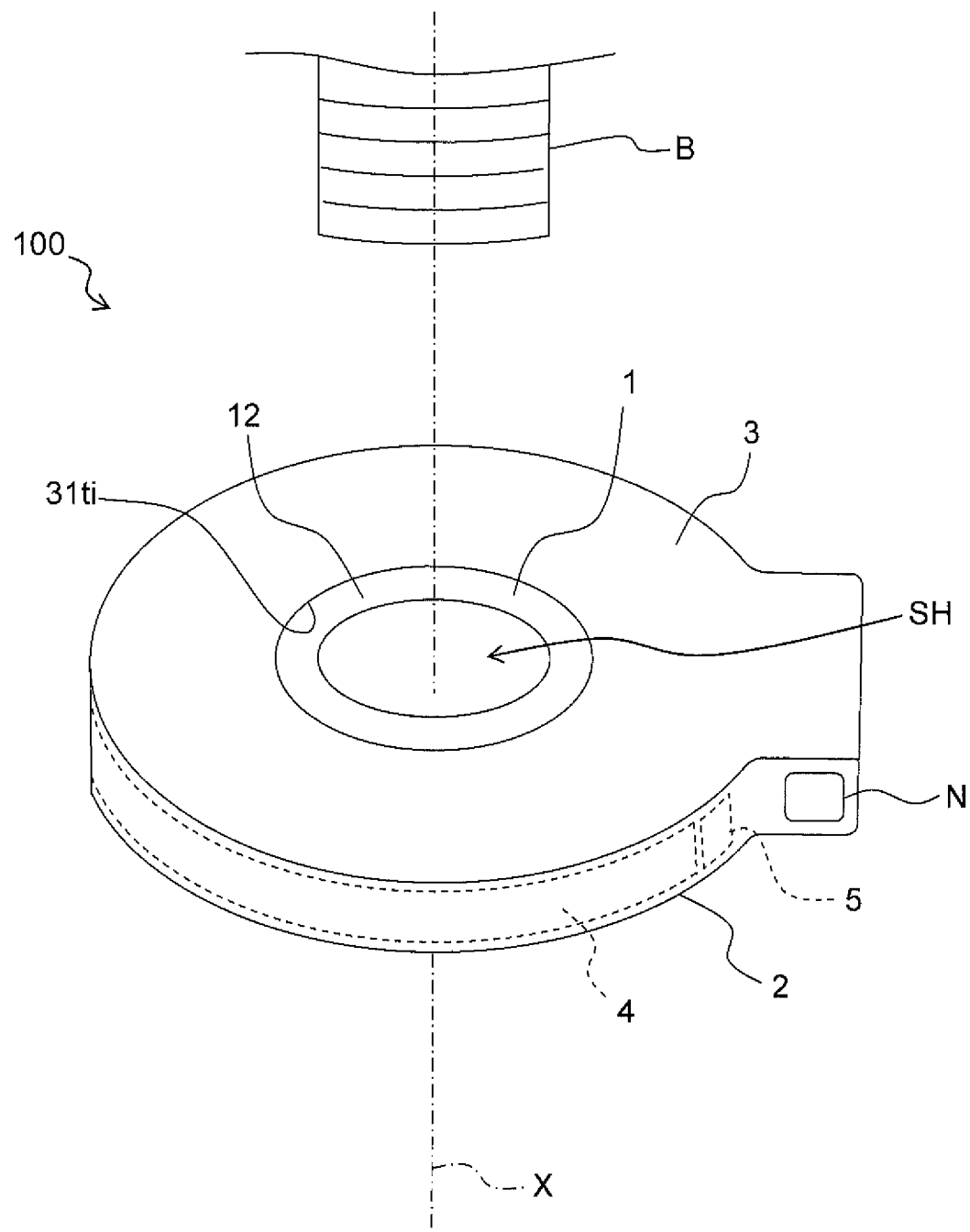
FIG. 1 is a perspective view of a bolt sensor related to an embodiment of the present disclosure.
Figure 2:
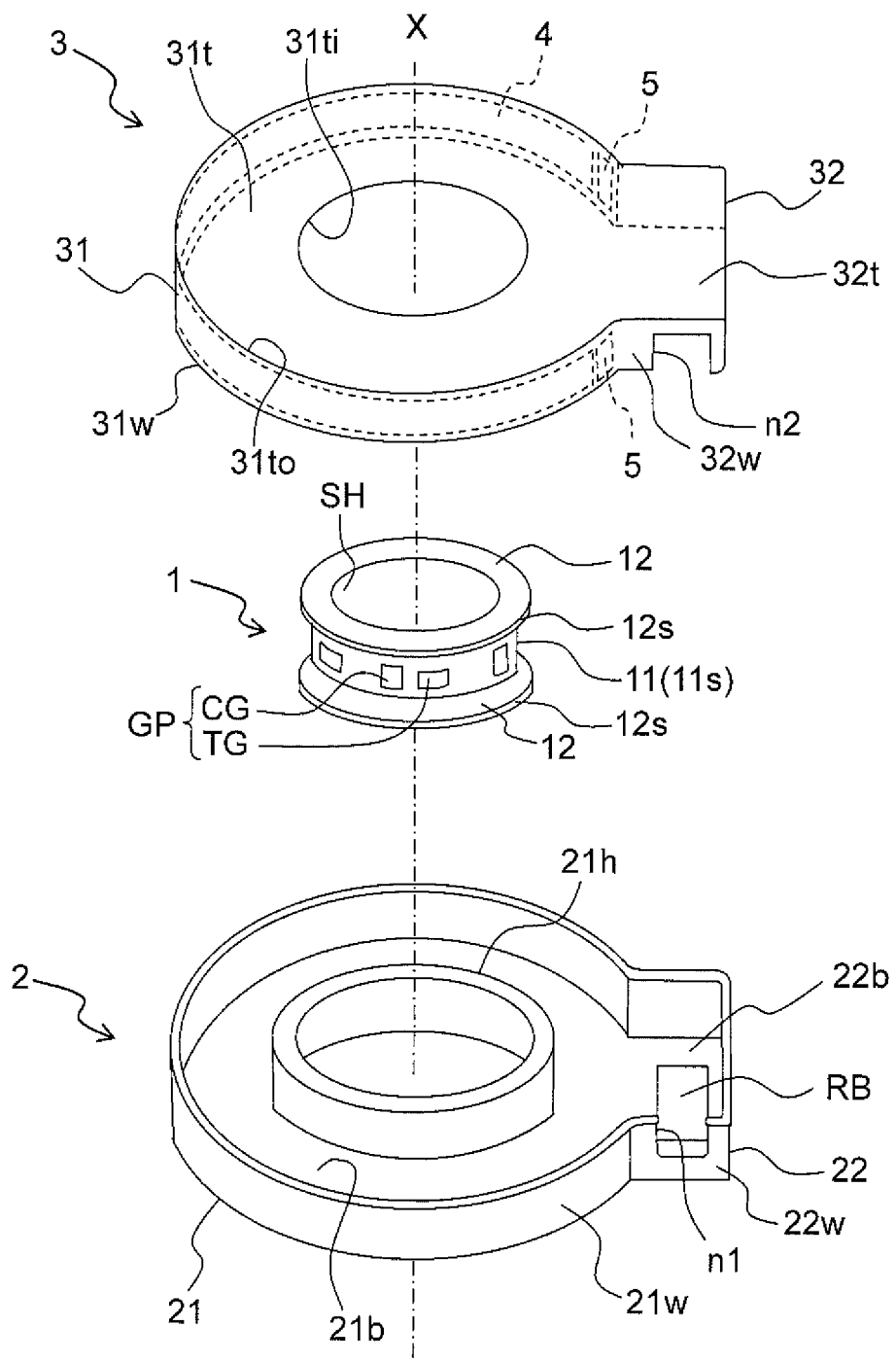
FIG. 2 is an exploded perspective view of the bolt sensor related to the embodiment of the present disclosure.

As depicted in FIGS. 1 and 2, a bolt sensor 100 related to this embodiment mainly includes an approximately cylindrical sensor (sensor main body) 1 having a through hole into which a bolt is to be inserted, a base 2 housing and holding the sensor 1, a cover 3 covering the base 2, and a light guide 4 fixed to the cover 3. A direction of a central axis X of the approximately cylindrical sensor 1 is a direction along which a bolt B is inserted in use of the bolt sensor 100. In the following, the direction of the central axis X of the sensor 1 (an axial direction of a shaft of the inserted bolt B), a radial direction of the sensor 1 (a radial direction of the inserted bolt B), and a circumferential direction of the sensor 1 (a circumferential direction of the inserted bolt B) are defined as an axial direction, a radial direction, and a circumferential direction of the bolt sensor 100, the base 2, the cover 3, and the light guide 4.

The sensor 1 detects the change in the fastening force of bolt joint, such as looseness of the bolt B. The sensor 1 includes a cylindrical body 11, two flanges 12, and four strain sensor pairs (strain gage pairs) GP. The two flanges 12, which have an outer diameter larger than that of the body 11, are disposed on both ends of the body 11 in the direction of the central axis X. The four strain sensor pairs GP are attached to an outer circumferential surface 11s of the body 11.

The body 11 and the flanges 12 have the same inner diameter. An inner circumferential surface of the body 11 continues to inner circumferential surfaces of the flanges 12. This continuous surface defines a through hole SH extending in the direction of the central axis X. The bolt B is inserted into the through hole SH in use of the bolt sensor 100. The diameter of the through hole SH may be approximately the same as or larger than the diameter of the shaft of the bolt B.

The four strain sensor pairs GP are attached to the outer circumferential surface 11s of the body 11 at regular intervals in the circumferential direction. Each strain sensor pair GP includes a compressive strain sensor (compressive strain gage) CG and a tensile strain sensor (tensile strain gage) TG. The compressive strain sensor CG detects compressive strain which is generated in the body 11 in the axial direction. The tensile strain sensor TG detects tensile strain which is generated in the body 11 in the circumferential direction. Four compressive strain sensors CG are arranged 90 degrees apart in the circumferential direction on the outer circumferential surface 11s of the body 11, and four tensile strain sensors TG are arranged 90 degrees apart in the circumferential direction on the outer circumferential surface 11s of the body 11.

The base 2 includes a sensor holding part 21 holding the sensor 1 and a board housing part 22 housing a relay board (board) RB. The sensor holding part 21 includes a holding cylinder 21h, a peripheral wall 21w, and a bottom surface 21b. The holding cylinder 21h holds the sensor 1 to surround the outer periphery of the sensor 1. The peripheral wall 21w, which is concentric with the holding cylinder 21h, extends around the holding cylinder 21h. The bottom surface 21b, which has an approximately circular ring shape, connects the holding cylinder 21h and the peripheral wall 21w.

The board housing part 22, which has a rectangular parallelepiped shape, protrudes from a part of the sensor holding part 21 in its circumferential direction toward the outside of the sensor holding part 21 in its radial direction. A cutout n1 is formed in one of side walls 22w of the board housing part 22 extending from the peripheral wall 21w. The relay board RB is placed on a bottom surface 22b of the board housing part 22.

The sensor 1 is inserted into the holding cylinder 21h of the sensor holding part 21 in the direction of the central axis X. This allows the holding cylinder 21h to hold the sensor 1 while bringing its inner circumferential surface into contact with an outer circumferential surfaces 12s of the flanges 12 of the sensor 1.

The cover 3, which has an approximately circular ring shape corresponding to the base 2, includes a main body 31 covering the sensor holding part 21 of the base 2 and a board cover part 32 covering the board housing part 22 of the base 2. The cover 3 is made of a light transmissive member such as polycarbonate. A top plate 3 it of the main body 31 includes an inner periphery 31ti in a circular shape and an outer periphery 31 to in a substantially circular shape. A peripheral wall 31w is formed to stand upright from the outer periphery 31 to of the top plate 31t.

The board cover part 32 includes a rectangular top plate 32t and side walls 32w formed to stand upright from the outer periphery of the top plate 32t. A cutout n2 is formed in one of the side walls 32w to correspond to the cutout n1 of the side wall 22w of the board housing part 22.

The cover 3 is fitted to the base 2 holding the sensor 1 in a manner such that the peripheral wall 31w and the side walls 32w are positioned outside the peripheral wall 21w and the side walls 22w of the base 2 and the inner periphery 31ti of the top plate 31t is positioned outside one of the flanges 12 of the sensor 1 (FIG. 1). Overlapping the cutouts n1, n2 defines an opening N (FIG. 1).

The light guide 4 is fixed to almost the whole area of the inner surface of the peripheral wall 31w of the cover 3 to extend along the outer peripheral of the sensor 1. One LED (light source) 5 is provided at each of both ends of the light guide 4 in the circumferential direction, that is, each LED 5 is provided in the peripheral wall 31w to be positioned in the vicinity of the board cover part 32.

Figure 3:
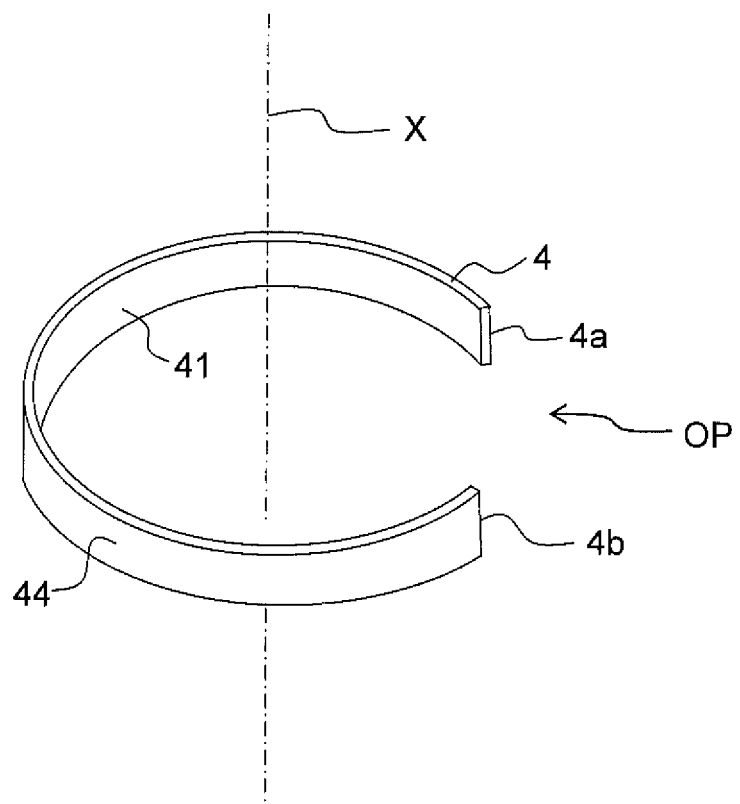
FIG. 3 is a perspective view of a light guide to be attached to a cover.
Figure 4:
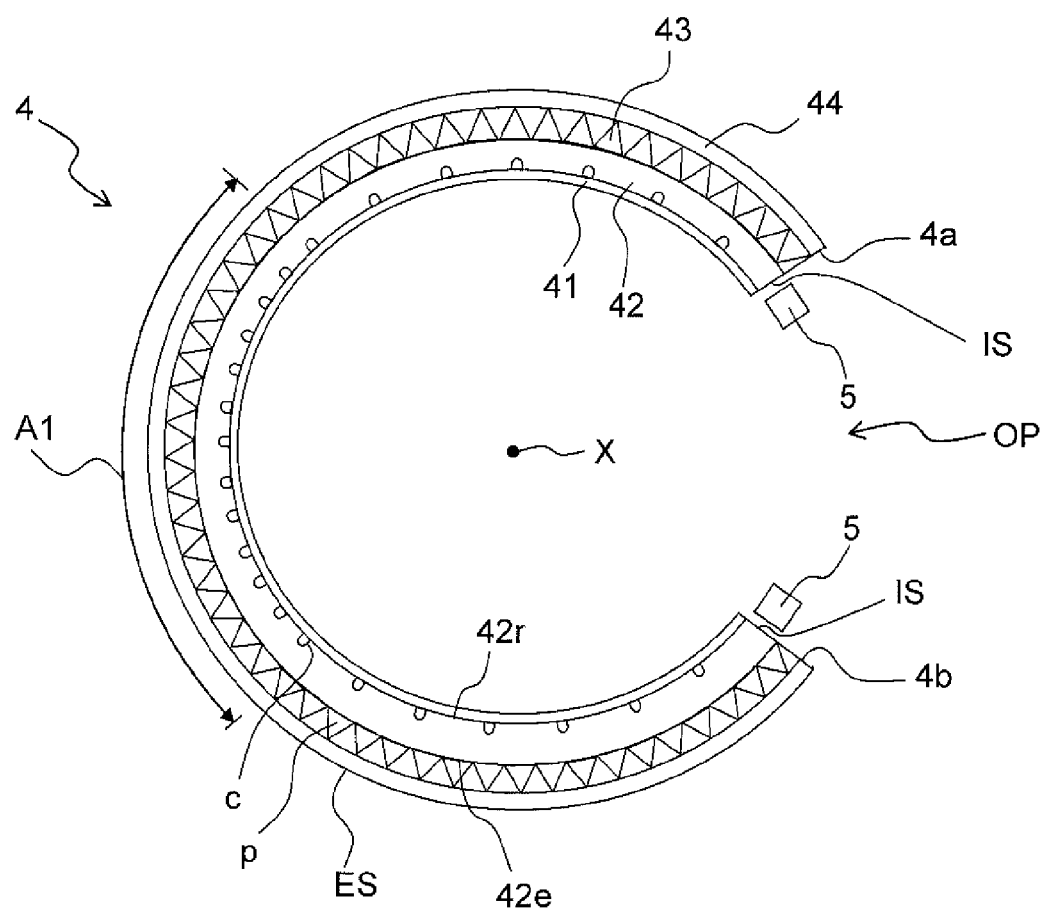
FIG. 4 is an enlarged view of the light guide as viewed in its axial direction.

As depicted in FIG. 3, and FIG. 4 which is an enlarged view of FIG. 3 as viewed in the direction of the central axis X and enlarged greatly in the radial direction in particular, the light guide 4 has a C-shape in which a stacked body, which includes a belt-like reflection film 41, light guide plate 42, prism sheet 43, and diffusion sheet 44, is curled into an arc-like shape. The stacked body is curled so that end surfaces 4a, 4b of the stacked body in the longitudinal direction come close to each other. In other words, the light guide 4 has a circular ring shape in which an opening OP is defined between the end surfaces 4a, 4b. The LEDs 5 are individually disposed in the opening OP to emit light to the ends 4a, 4b of the light guide 4.

The reflection film 41, the light guide plate 42, the prism sheet 43, and the diffusion sheet 44 are stacked from the inside to the outside in the radial direction in that order, and the reflection film 41 is disposed to face the peripheral wall 21w of the base 2. The diffusion sheet 44 is directly bonded or adhered to the transparent peripheral wall 31w of the cover 3.

The structure of the reflection film 41, the light guide plate 42, the prism sheet 43, and the diffusion sheet 44 will be explained further with reference to FIG. 4.

The light guide plate 42 guides, along the circumferential direction, the light from the LEDs 5 disposed on both ends of the light guide 4. In this embodiment, the light guide plate 42 is a bent plate made of polycarbonate resin. End surfaces of the light guide plate 42 in the longitudinal direction (circumferential direction) are incident surfaces (entrance surface) IS through which the light from the LEDs 5 enters. The radial-directional inner surface is a reflection surface 42r by which the light guided through the light guide plate 42 is reflected. The radial-directional outer surface is an emission surface 42e from which the light guided through the light guide plate 42 emits. The emission surface 42e and the refection surface (opposing surface) 42r are defined on the surfaces of the light guide plate 42 respectively, the surfaces being opposite to each other in the radial direction.

Figure 5:
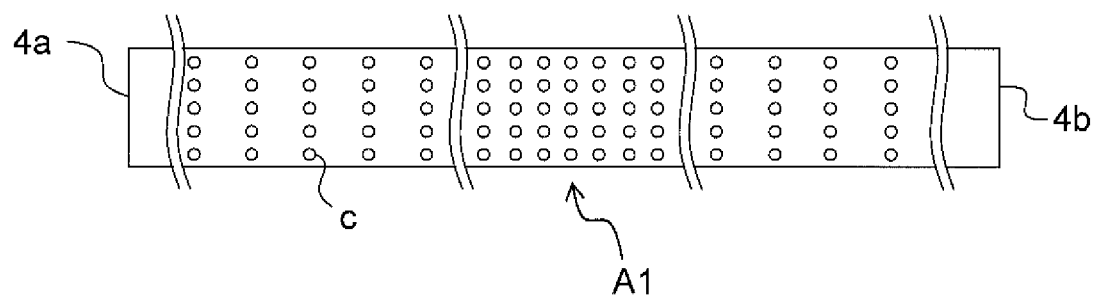
FIG. 5 is an illustrative view of a linearly-extended light guide plate as viewed in planer view.

The reflection surface 42r of the light guide plate 42 includes a plurality of concaves c. The concaves c, each of which is an approximately hemispherical depression, are disposed at uneven intervals along the circumferential direction in a manner such that their openings are included in the reflection surface 42r and their bottom parts are positioned on the side of the emission surface 42e (FIG. 4). As depicted in FIG. 5 depicting the reflection surface 42r in planer view, the concaves c are disposed at regular intervals in a lateral or width direction (axial direction) of the light guide plate 42.

The concaves c may be disposed in any manners in the reflection surface 42r. In this embodiment, the concaves c are disposed in a manner such that intervals (pitches) in an area A1 are smaller than intervals (pitches) in other areas (areas between the area A1 and the opening OP), the area A1 having a great distance from the opening OP of the light guide 4 in the circumferential direction, more specifically, substantially facing the opening OP in the radial direction. In other words, the concaves c are disposed densely in the area facing the opening OP in the radial direction, and they are disposed coarsely or roughly in other areas. Thus, the emission amount, of the light guided through the light guide plate 42, in the area A1 in which the concaves c are disposed densely is larger than those in other areas, as will be described later.

The reflection film 41 is provided to return the light leaking from the reflection surface 42r of the light guide plate 42 into the light guide plate 42. The reflection film 41 is disposed (stacked) on the inner side of the light guide plate 42 in the radial direction to cover the reflection surface 42r throughout. The reflection film 41 may be made of any material such as polyester resin.

The prism sheet 43 adjusts the directions of the light emitted from the emission surface 42e of the light guide plate 42 so that the light travels in the radial direction. The prism sheet 43 is disposed (stacked) on the outside of the light guide plate 42 in the radial direction to cover the emission surface 42e throughout. A plurality of linear prisms p extending in the axial direction are disposed on a surface, of the prism sheet 43, facing the outside in the radial direction at regular intervals along the circumferential direction. The prism sheet 43 may be made of any material such as polymethylmethacrylate (PMMA).

The diffusion sheet 44, which diffuses the light passing the prism sheet 43, is disposed (stacked) on the outside of the prism sheet 43 in the radial direction to cover the prism sheet 43 throughout. Many fine or minute beads are included in the diffusion sheet 44. The light, which enters the diffusion sheet 44 after passing the prism sheet 43, is diffused by beads and then emitted from the outer surface of the diffusion sheet 44. The diffusion sheet 44 may be made of any material such as acrylic resin.

In the light guide 4 related to this embodiment, the outer surface of the diffusion sheet 44 is a light emission surface ES from which the light emitted from the LEDs 5 and guided by the light guide 4 emits. The light emission surface ES is disposed to intersect with the radial direction perpendicular to the extending direction of the through hole SH of the sensor 1 or the axial direction of the bolt B inserted into the through hole SH. The light from the LEDs 5 is emitted through the light emission surface ES in the radial direction. The light emission surface ES extends along the outer periphery of the sensor 1 to surround the through hole SH of the sensor 1 in the circumferential direction, and thus the light is emitted widely in the circumferential direction through the light emission surface ES.

In the bolt sensor 100 configured as described above, the relay board RB is connected to the four compressive strain sensors CG of the sensor 1, the four tensile strain sensors TG of the sensor 1, and the LEDs 5 by unillustrated wiring lines. Further, the relay board RB is connected to an external power source and an external controller by unillustrated wiring lines passing the opening N. The relay board RB may mount an IC for control and a transmitting and receiving circuit for wireless communications, and the board housing part 22 may include a power source, such as a battery. In such a structure, the opening N may not be provided and the wiring lines which may be troublesome are unnecessary.

The operation of the bolt sensor 100 related to this embodiment is as follows.

When the bolt sensor 100 is used, the bolt is fastened in a state that the shaft of the bolt B is inserted into the through hole SH of the sensor 1. In this situation, for example, one of the flanges 12 of the sensor 1 contacts the head of the bolt B and the other of the flanges 12 contacts a body to which the bolt is applied.

Fastening the bolt in a state of disposing the bolt sensor 100 in the above manner generates the compressive strain in the radial direction and the tensile strain in the circumferential direction in the body 11 of the sensor 1. Each strain sensor pair GP attached to the body 11 of the sensor 1 detects the compressive strain and the tensile strain by using the compressive strain sensor CG and the tensile strain sensor TG and then transmits detection values to the relay board RB. The relay board RB determines whether or not the bolt B is fastened properly based on the detection values received.

Specifically, the relay board RB compares a first threshold value and the detection values of the compressive strain sensors CG and the tensile strains sensors TG. When the detection values are not more than the first threshold value, the relay board RB determines that the fastening force is not sufficient. When the detection values are more than the first threshold value, the relay board RB determines that the fastening force provides sufficient force. Further, the relay board RB compares a second threshold value and the detection values of the compressive strain sensors CG and the tensile strain sensors TG. When the detection values are the second threshold value or more, the relay board RB determines that the bolt B is fastened with excessive force.

When the relay board RB determines that the bolt is not being fastened properly, that is, when the relay board RB determines that the detection values of the compressive strain sensors CG and the tensile strain sensors TG are not more than the first threshold value (i.e., when the fastening force of the bolt is not sufficient), or when the relay board RB determines that the detection values of the compressive strain sensors CG and the tensile strain sensors TG are the second threshold value or more (i.e., when the bolt B is fastened with excessive force), voltage is applied to the LEDs 5 to generate light emission.

When the LEDs 5 are lit based on the determination of the relay board B, the light from the LEDs 5 is emitted from the light emission surface ES after passing the light guide 4. Specifically, the light entering the incident surfaces IS of the light guide plate 42 travels through the light guide plate 42 while being reflected by the inner surfaces of the light guide plate 42, and a part of the travelling lights is reflected by the concaves c of the reflection surface 42r to travel toward the prism sheet 43 (the emission surface 42e). The prism sheet 43 adjusts the travelling directions of the light such that the light travels outward in the radial direction, and the light is emitted from the light emission surface ES to the outside in the radial direction after being diffused by the diffusion sheet 44.

Since the concaves c of the light guide plate 42 are formed more densely in the area A1 than other areas, a quantity of light guided by the concaves c toward the prism sheet 43 (emission surface 42e) is larger in the area A1 than other areas. Thus, a larger quantity of light is emitted from the light emission surface ES in the area A1 than other areas (light emission in the area A1 is more intense than other areas).

By using the bolt sensor 100, a worker fastening the bolt B can fasten the bolt B properly by stopping the fastening action when the light from the light emission surface ES of the bolt sensor 100 disappears. Further, the worker can judge that the bolt B is fastened excessively when the light from the light emission surface ES appears again after the disappearance of the light. Further, an inspector or the like inspecting looseness of the bolt B can confirm whether or not the bolt-joint part is fastened with sufficient strength, simply by confirming the presence of the light emission from the light emission surface ES of the bolt sensor 100.

Effects of the bolt sensor 100 related to this embodiment are as follows.

The bolt sensor 100 related to this embodiment includes the light guide 4 (light emission surface ES) extending along the outer periphery of the sensor 1 into which the bolt B is to be inserted and surrounding the through hole SH of the sensor 1. The bolt sensor 100 is configured to emit the light from the light emission surface ES in the radial direction. Thus, a user can visually confirm the light from the light emission surface ES without difficulty, even when any surrounding member(s) and the like prohibit(s) the user from visually confirming the bolt B.

In the bolt sensor 100 related to this embodiment, the light guide 4 (light emission surface ES) surrounds, in the circumferential direction, the outer periphery of the sensor 1 and a predetermined area defined outside of the through hole SH of the sensor 1. This allows the light from the light emission surface ES to be emitted widely in the circumferential direction. Thus, even when many other members and the like are disposed in the vicinity of the bolt joint part, the user can visually confirm at least a part of the light from the light emission surface ES to reliably notice or find the looseness of the bolt.

In the bolt sensor 100 related to this embodiment, the light emission intensity in a specific area of the light emission surface ES is higher than other areas. Thus, it is possible to facilitate the inspection by arranging the bolt sensor 100 such that the specific area faces a direction in which the user is expected to confirm the bolt-joint part during the inspection.

In the light guide 4 of the bolt sensor 100 related to this embodiment, the diffusion sheet 44 is disposed outside the prism sheet 43 and the outer surface of the diffusion sheet 44 is used as the light emission surface ES. This allows the user to visually confirm the light from the light emission surface ES over wide angles.

In the bolt sensor 100 related to this embodiment, the light guide 4 is disposed inside the cover 3. Thus, the light guide 4 is protected from ambient environment, resulting in high weather resistance and high durability.

In the bolt sensor 100 related to this embodiment, the light guide 4 is fixed to the periphery wall 31w of the cover 3. The present disclosure, however, is not limited thereto. The light guide 4 may be fixed to the outer circumferential surface 11s of the body 11 of the sensor 1, the outer circumferential surface 12s of one or both of the flanges 12 of the sensor 1, or the outer surface of the peripheral wall 21w of the sensor holding part 21 of the base 2 by use of adhesive or the like. If the base 2 is transparent, the light guide 4 may be fixed to the outer circumferential surface of the holding cylinder 21h. When the light guide 4 is fixed to the sensor 1, the base 2 and the cover 3 may not be provided. When the light guide 4 is fixed to the base 2, the cover 3 may not be provided.

In the bolt sensor 100 related to this embodiment, the light guide 4 is the stacked body including the reflection film 41, the light guide plate 42, the prism sheet 43, and the diffusion sheet 44. The present disclosure, however, is not limited thereto. The light guide 4 may not include at least one or all of the reflection film 41, the prism sheet 43, and the diffusion sheet 44. In this case also, the light emission surface ES is defined as the outermost surface of the light guide 4 in the radial direction. For example, in a structure in which the light guide plate 42 is disposed on the outermost side, the emission surface 42e of the light guide plate 42 functions as the light emission surface ES.

In the bolt sensor 100 related to this embodiment, the light guide plate 42 includes the concaves c formed densely in the area A1 of the light guide 4. The area in which the concaves c are formed densely (the area in which the light emission intensity of the light emission surface ES is high), however, may be any other area of the light guide 4. By designing the arrangement of the concaves c based on the actual usage condition of the bolt sensor 100, the bolt sensors 100 each of which is optimal for each bolt-fastening point can be provided. Further, the light guide plate 42 may include the concaves c formed at regular intervals in the circumferential direction so that the light emission intensity of the light emission surface ES may be constant in the circumferential direction.

In the bolt sensor 100 related to this embodiment, the light guide plate 42 includes the concaves c formed at non-uniform intervals in the circumferential direction, thereby varying the light emission intensity of the light emission surface ES. The present disclosure, however, is not limited thereto. For example, the light emission intensity of the light emission surface ES can be varied by forming linear prisms p of the prism sheet 43 at non-uniform intervals in the circumferential direction. In this case, the concaves c may be formed in the light guide plate 42 at regular intervals in the circumferential direction. Further, the concaves c may not be formed in the reflection surface 42r of the light guide plate 42.

The reflection surface 42r of the light guide plate 42 related to this embodiment may include grooves extending in the axial direction instead of or in addition to the concaves c. These grooves can guide the light passing through the light guide plate 42 toward the emission surface 42e. In the present disclosure, the "concaves" include not only the concaves c but also such grooves.

In the bolt sensor 100 related to this embodiment, any other light sources, such as laser diodes (LD), may be used instead of the LEDs 5. The bolt sensor 100 may include only one light source, such as the LED 5 or the laser diode.

In the bolt sensor 100 related to this embodiment, voltage is applied to the LEDs 5 to generate light emission, when the relay board RB determines that the detection values of the compressive strain sensors CG and the tensile strain sensors TG are not more than the first threshold value (i.e., when the fastening force of the bolt is not sufficient), or when the relay board RB determines that the detection values of the compressive strain sensors CG and the tensile strain sensors TG are the second threshold value or more (i.e., when the bolt B is fastened with excessive force). The present disclosure, however, is not limited thereto. As a modified example of the embodiment, the voltage may be applied to the LEDs 5 to generate light emission, when the relay board RB determines that the detection values of the compressive strain sensors CG and the tensile strain sensors TG are greater than the first threshold value and smaller than the second threshold value (i.e., when the bolt B is fastened properly).

The board housing part 22 and the board cover part 32 may be eliminated from the bolt sensor 100 related to the embodiment. In this bolt sensor 100, the relay board RB may be disposed in the sensor holding part 21 or disposed outside the bolt sensor 100. In this case, the sensor holding part 21 of the base 2 and the main body 31 of the cover 3 may each have an outer periphery in a circular-ring shape, and the light guide 4 may be disposed over the whole area in the circumferential direction or almost the whole area in the circumferential direction except for parts at which the LEDs 5 are provided.

The bolt sensor 100 related to this embodiment includes the sensor 1 provided with the cylindrical body 11 and the four strain sensor pairs GP attached to the outer circumferential surface 11s. The present disclosure, however, is not limited thereto. As a modified example of this embodiment, the body 11 of the sensor 1 may be a tube-like member having any cross-sectional shape such as a polygon. In this case also, the light guide 4 is disposed along the outer periphery of the sensor 1 by being fixed directly to the outer periphery of the sensor 1 having any shape such as the polygon, or fixed to the base 2 or the cover 3. Thus, the light guide 4 may have any shape such as a circular-ring shape or a polygon. Three or less or five or more of strain sensor pair(s) GP may be provided. Instead of the strain sensor pairs GP, either the compressive strain sensors CG or the tensile strain sensors TG may be provided.

In the bolt sensor 100 related to this embodiment, the light from the LEDs 5 (light sources) is emitted after passing through the light guide 4 which extends in the outer periphery of the sensor 1. Thus, the user can easily confirm the fastened state of the bolt by visually confirming the light emitted from the light guide 4.

In the bolt sensor 100 related to this embodiment, forming the concaves c densely in a part of the reflection surface 42r (opposing surface) allows a part of the sensor 1 in the circumferential direction to have the intensity of light emitted from the light guide 4 which is more intense than other parts of the sensor 1. Thus, determining the position at which the light intensity is high according to the usage condition of the bolt sensor 100 makes the visual confirmation of the light emitted from the light guide 4 easier for the user.

In the bolt sensor 100 related to this embodiment, the diffusion sheet 44 is disposed on the prism sheet 43. This allows the user to visually confirm the light emitted from the light guide 4 over wide angles.

In the bolt sensor 100 related to this embodiment, the visual confirmation of the light emitted from the light guide 4 is made easier for the user by extending the light guide 4 to surround the outer periphery of the sensor 1 substantially entirely.

In the bolt sensor 100 related to this embodiment, the cover 3 covers the light guide 4. This increases the weather resistance and durability of the bolt sensor 100.

The present invention is not limited to the above embodiment provided that the characteristics of the present invention can be obtained. The present invention includes any other embodiments which can be conceived in the range of the technical ideas of the present invention.

The bolt sensors related to the above embodiments easily and reliably detect a fastened state of the bolt without being affected by usage conditions (ambient environments) of the bolt.

What is claimed is:

1. A bolt sensor configured to detect a fastened state of a bolt, comprising:
   a sensor body including a through hole into which a shaft of the bolt is to be inserted;
   a light guide extending along an outer periphery of the sensor body; and
   a light source configured to emit light to the light guide based on output of the sensor body, wherein
   the light guide includes a light guide plate having an incident surface through which the light from the light source enters into the light guide plate and an emission surface from which the light entered into the light guide plate through the incident surface is emitted, and
   an opposing surface, of the light guide plate, on an opposite side of the emission surface has a plurality of concaves which reflect the light entered into the light guide plate through the incident surface toward the emission surface.

2. The bolt sensor according to claim 1, wherein a density of the plurality of concaves are higher in a part of the opposing surface than other parts of the opposing surface.

3. The bolt sensor according to claim 1, wherein the light guide further includes a prism sheet disposed on the emission surface of the light guide plate and a diffusion sheet disposed on the prism sheet.

4. The bolt sensor according to claim 1, wherein the light guide extends to surround the outer periphery of the sensor body substantially entirely.

5. The bolt sensor according to claim 1, further comprising a cover covering the light guide.

6. The bolt sensor according to claim 1, further comprising a board which is connected to the sensor body and the light source and which is configured to turn on the light source based on a comparison between the output of the sensor body and a predetermined value.

7. The bolt sensor according to claim 1, wherein the sensor body includes a body section including the through hole and a strain sensor attached to the body section.

8. The bolt sensor according to claim 1, wherein the light source is provided on the sensor body.

* * * * *